(12) United States Patent
Rivas et al.

(10) Patent No.: US 11,167,655 B2
(45) Date of Patent: *Nov. 9, 2021

(54) CHARGING STATION AND CONNECTOR THEREFOR, AND METHOD OF CHARGING AN ELECTRIC VEHICLE WITH A CHARGING STATION

(71) Applicant: EATON INTELLIGENT POWER LIMITED, Dublin (IE)

(72) Inventors: Michel Rivas, Williamsburg, VA (US); Paul David Seff, Williamsburg, VA (US); David Austin Eldridge, Knoxville, TN (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 16/843,125

(22) Filed: Apr. 8, 2020

(65) Prior Publication Data

US 2020/0231052 A1 Jul. 23, 2020

Related U.S. Application Data

(63) Continuation of application No. 14/989,980, filed on Jan. 7, 2016, now Pat. No. 10,647,207.

(51) Int. Cl.
*B60L 53/30* (2019.01)
*H01R 13/641* (2006.01)
*B60L 53/16* (2019.01)
*H01R 13/66* (2006.01)
*H01R 13/717* (2006.01)

(52) U.S. Cl.
CPC ............. *B60L 53/30* (2019.02); *B60L 53/16* (2019.02); *H01R 13/641* (2013.01); *H01R 13/665* (2013.01); *H01R 13/7175* (2013.01); *H01R 2201/26* (2013.01)

(58) Field of Classification Search
CPC ...... B60L 53/16; B60L 53/30; B60L 11/1818; H01R 13/641; H01R 13/665; H01R 13/7175; H01R 2201/26
USPC ........................................................ 320/109
See application file for complete search history.

(56) References Cited

U.S. PATENT DOCUMENTS

| | | | |
|---|---|---|---|
| 6,081,205 A * | 6/2000 | Williams | B60L 53/68 340/932.2 |
| 6,225,776 B1 | 5/2001 | Chai | |
| 8,768,563 B2 | 7/2014 | Nitzberg et al. | |
| 9,071,074 B2 | 6/2015 | Chen | |
| 2011/0051471 A1* | 3/2011 | Chen | H05B 45/37 363/21.16 |
| 2011/0144823 A1 | 6/2011 | Muller et al. | |

(Continued)

*Primary Examiner* — Nathaniel R Pelton
(74) *Attorney, Agent, or Firm* — Eckert Seamans Cherin & Mellott, LLC

(57) ABSTRACT

A connector is for a charging station. The charging station has a charging box having a signaling mechanism. The connector includes an electrical receptacle structured to be electrically connected to the signaling mechanism; a housing coupled to the electrical receptacle; an indicating assembly coupled to the interior of the housing and structured to indicate a charging status state provided by the signaling mechanism; and an interface between the indicating assembly and the signaling mechanism in order to energize the indicating assembly and provide an indication of charging status.

14 Claims, 4 Drawing Sheets

(56) References Cited

U.S. PATENT DOCUMENTS

| | | |
|---|---|---|
| 2011/0172839 A1 | 7/2011 | Brown et al. |
| 2012/0126747 A1* | 5/2012 | Kiko ................... B60L 3/0069 |
| | | 320/109 |
| 2012/0164850 A1 | 6/2012 | Kobayashi et al. |
| 2013/0169226 A1 | 7/2013 | Read |
| 2013/0201641 A1 | 8/2013 | Soden et al. |
| 2014/0015482 A1* | 1/2014 | Nitzberg ................ B60L 53/18 |
| | | 320/109 |
| 2015/0015202 A1* | 1/2015 | Im ......................... B60L 58/12 |
| | | 320/109 |

* cited by examiner

CHARGING STATION AND CONNECTOR THEREFOR, AND METHOD OF CHARGING AN ELECTRIC VEHICLE WITH A CHARGING STATION

CROSS-REFERENCE TO RELATED APPLICATION

This application is a continuation of application Ser. No. 14/989,980, filed Jan. 7, 2016, and entitled "CHARGING STATION AND CONNECTOR THEREFOR, AND METHOD OF CHARGING AN ELECTRIC VEHICLE WITH A CHARGING STATION" the contents of which are incorporated herein by reference.

BACKGROUND

Field

The disclosed concept pertains generally to charging stations and, more particularly, to charging stations for electric vehicles (EVs). The disclosed concept further pertains to connectors for charging stations. The disclosed concept further pertains to methods of charging EVs with a charging station.

Background Information

With the development of electric vehicle technology, the number of EVs is growing rapidly, and electric vehicle charging stations, similar to gas stations, have become popular. An EV charging station, also called an electric recharging point, charging point, and EVSE (Electric Vehicle Supply Equipment), is an element in an infrastructure that supplies electric energy for the recharging of electric vehicles, plug-in hybrid electric-gasoline vehicles, or semi-static and mobile electrical units such as exhibition stands. An EV charging station is a device that safely allows electricity to flow. These charging stations and the protocols established to create them are known as EVSE, and they enhance safety by enabling two-way communication between the charging station and the electric vehicle.

The 1996 NEC and California Article 625 define EVSE as being the conductors, including the ungrounded, grounded, and equipment grounding conductors, the electric vehicle connectors, attachment plugs, and all other fittings, devices, power outlets or apparatus installed specifically for the purpose of delivering energy from premises wiring to an electric vehicle. EVSE is defined by the Society of Automotive Engineers (SAE) recommended practice J1772 and the National Fire Protection Association (NFPA) National Electric Code (NEC) Article 625. While the NEC defines several safety requirements, J1772 defines the physical conductive connection type, five pin functions (i.e., two power pins (Hot1 and Hot2 or neutral; or Line 1 and Line 2), one ground pin, one control pilot pin, and one proximity pin), the EVSE to EV handshake over the pilot pin, and how both parts (EVSE and EV) are supposed to function. Two-way communication seeks to ensure that the current passed to the EV is both below the limits of the EV charging station itself and below the limits of what the EV can receive. There are additional safety features, such as a safety lock-out, that does not allow current to flow from the EV charging station until the EV connector or EV plug is physically inserted into the EV and the EV is ready to accept energy. For example, J1772 in North America uses a very simple but effective pilot circuit and handshake in the EVSE.

EV charging stations consist generally of a completely separate and unique box along with a connected EV cable/connector for the intended purpose of charging the EV. In known EV charging stations, charging status is provided on the charging box, which commonly includes a number of indicators for power and state. However, it is desirable to have additional indicators of charging status on the EV charging station.

There is, therefore, room for improvement in charging stations and in connectors therefor.

There is also room for improvement in methods of charging an EV with a charging station.

SUMMARY

These needs and others are met by embodiments of the disclosed concept, which are directed to a charging station and connector therefor, and a method of charging an EV with a charging station, in which an indicating assembly of the connector provides an indication of charging status.

In accordance with one aspect of the disclosed concept, a connector for a charging station is provided. The charging station has a charging box having a signaling mechanism. The connector includes an electrical receptacle structured to be electrically connected to the signaling mechanism; a housing coupled to the electrical receptacle; an indicating assembly coupled to the housing; and an interface between the indicating assembly and the signaling mechanism in order to energize the indicating assembly and provide an indication of charging status.

In accordance with another aspect of the disclosed concept, a charging station comprises a charging box having a signaling mechanism; and a connector comprising an electrical receptacle electrically connected to the signaling mechanism, a housing coupled to the electrical receptacle, an indicating assembly coupled to the housing, and an interface between the indicating assembly and the signaling mechanism in order to energize the indicating assembly and provide an indication of charging status.

In accordance with another aspect of the disclosed concept, a method of charging an electric vehicle with a charging station is provided. The charging station includes a charging box and a connector. The charging box has a signaling mechanism. The connector includes an electrical receptacle electrically connected to the signaling mechanism, a housing coupled to the electrical receptacle, an indicating assembly coupled to the housing, and an interface between the indicating assembly and the signaling mechanism. The method includes the steps of mechanically coupling and electrically connecting the electrical receptacle to the electric vehicle; sending a signal from the signaling mechanism to the indicating assembly; and energizing the indicating assembly in order to provide an indication of charging status.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

As employed herein, the term "number" shall mean one or an integer greater than one (i.e., a plurality).

As employed herein, the statement that two or more parts are "connected" or "coupled" together shall mean that the parts are joined together either directly or joined through one or more intermediate parts.

As employed herein, the term "charging state" shall mean a state in which electric power is being transferred from one source into another. For example and without limitation, a charging state in which a charging station is mechanically coupled and electrically connected to an EV is a state in which electric power is being transferred from the charging station into the EV.

As employed herein, the term "error state" shall mean a state in which electric power is not being transferred from one source to another, and in which there is a problem with the connection between the two sources. For example and without limitation, an error state in which a charging station is attempting to charge an EV is a state in which there is a problem with the connection between the charging station and the EV, and as a result electric power is not being transferred from the charging station into the EV.

As employed herein, the term "power ready state" shall mean a state in which electric power is ready to be transferred from one source into another, but is not being transferred because the two sources are not mechanically coupled and are not electrically connected. For example and without limitation, a power ready state of a connector that is not mechanically coupled or electrically connected to an EV is a state in which the connector is ready to transfer electric power, but is not able to because of the lack of connection with the EV.

As employed herein, the term "charging box" shall mean an apparatus having any geometry (e.g., box-shaped and non-boxed shaped geometries), and that is structured to produce an electric charge for the purpose of charging an EV.

Figure 1:
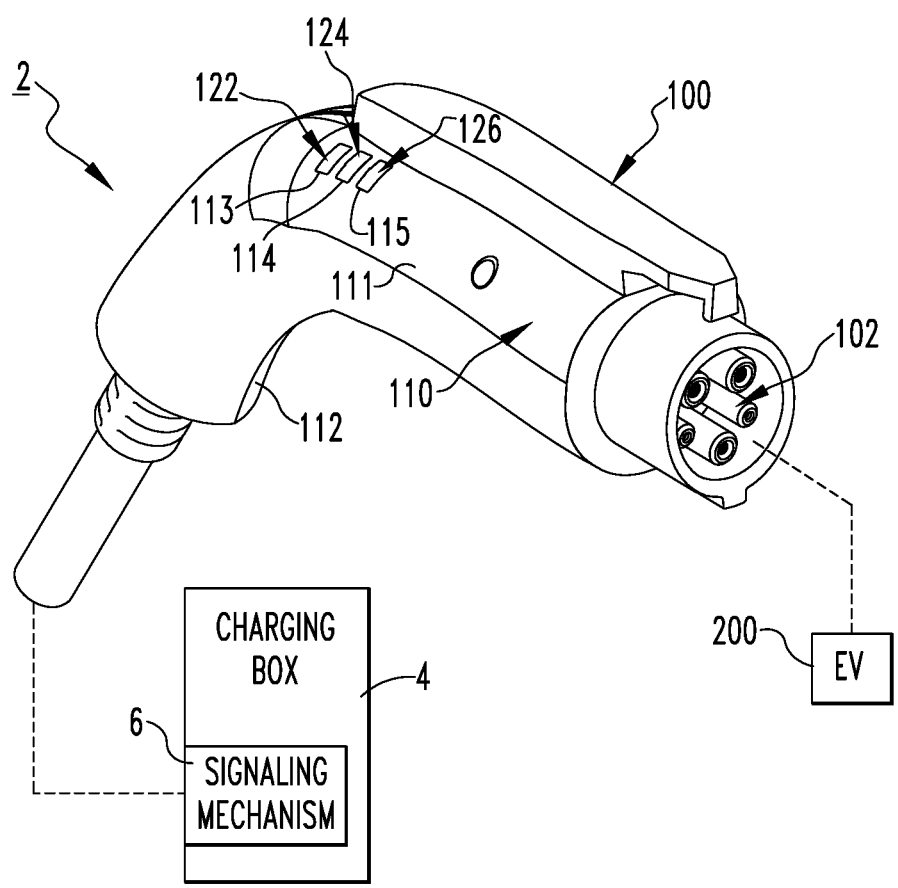
FIG. 1 is a partially simplified view of a charging station and connector therefor, shown as employed with an EV, in accordance with a non-limiting embodiment of the disclosed concept.

FIG. 1 shows a partially simplified view of a charging station 2 with an EV 200, in accordance with a non-limiting embodiment of the disclosed concept. The example charging station 2 includes a charging box 4 and a connector 100 coupled to the charging box 4. As will be discussed in greater detail below, the connector 100 advantageously provides a visual indication to an operator (e.g., a driver of the EV 200) of charging status. That is, in addition to any indicators provided on the charging box 4 or the EV 200, the connector 100 provides a separate mechanism for the operator to know charging status. This is beneficial to the operator, who now does not need to rely entirely on the charging box 4 and the EV 200 to know whether or not the EV 200 is being charged or is able to be charged by the charging station 2 before being connected to the EV 200. Thus, when connected to the EV 200, the connector 100 is structured to indicate to the operator whether there is a charging state or whether there is an error state. Additionally, when the connector 100 is not connected to the EV 200, the connector 100 is also structured to provide a visual indication of whether or not there is a power ready state. In this manner, the operator can save time by more easily determining whether or not the EV 200 is being charged, or will be able to be charged, distinct from prior art charging stations (not shown) in which visual indication of charging status is only provided on the charging box and the EV.

The charging box 4 has a signaling mechanism 6, and the connector 100 has an electrical receptacle 102 that is electrically connected to the signaling mechanism 6. The EV 200 has a pilot signal that has a voltage which allows charging status to be determined, as will be discussed below. In operation, when the operator mechanically couples and electrically connects the receptacle 102 to the EV 200, and activates the charging box 4, the EV 200 is able to be charged.

Figure 2:
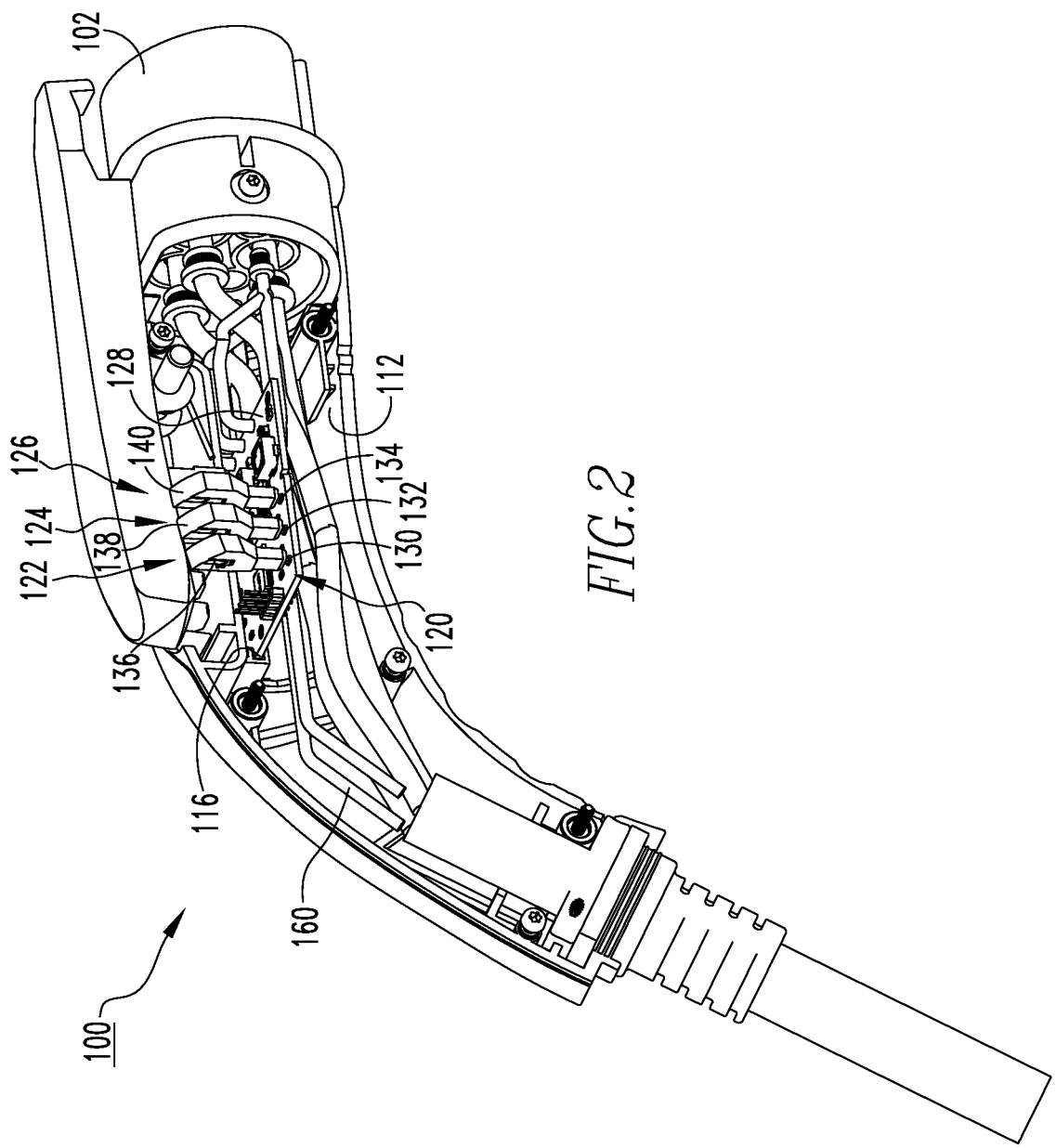
FIG. 2 is a front isometric view of the connector of FIG. 1, shown with a housing member removed in order to see hidden structures.

The connector 100 further includes a housing 110 having first and second housing members 111,112 that are each coupled to the electrical receptacle 102 and to each other. Additionally, as shown in FIG. 2, the connector 100 includes an indicating assembly 120 coupled to the second housing member 112, and an interface (e.g., without limitation, electrical wire 160). The wire 160 electrically connects the indicating assembly 120 to the signaling mechanism 6 (FIG. 1) so that the signaling mechanism 6 can communicate with the indicating assembly 120 and cause the indicating assembly 120 to provide the visual indication of charging status. It is also within the scope of the disclosed concept for an interface (not shown) to wirelessly communicate a signal from the signaling mechanism 6 to the indicating assembly 120. The interface (e.g., the electrical wire 160 or a wireless communication (not shown)) between the indicating assembly 120 and the signaling mechanism 6 energizes the indicating assembly 120 to provide the visual indication of charging status.

More specifically, responsive to a signal from the signaling mechanism 6, the indicating assembly 120 provides a visual indication corresponding to a charging state, an error state, or a power ready state. It will be appreciated that in an alternative embodiment, a visual indication of any suitable number and/or combination of charging states could be provided on a suitable alternative connector (not shown), without departing from the scope of the disclosed concept. For example and without limitation, it is within the scope of the disclosed concept for a connector (not shown) to only have a visual indication for a charging state, and not have visual indications for error and power ready states.

The indicating assembly 120 includes a number of light sources 122,124,126 and a printed circuit board 128 mechanically coupled and electrically connected to the light sources 122,124,126. The light sources 122,124,126 and the printed circuit board 128 are electrically connected to the wire 160 in order to allow the signaling mechanism 6 to energize the light sources 122,124,126. In other words, once the charging status is determined by a suitable voltage or charge reading, the signaling mechanism 6 sends a signal through the wire 160 to the printed circuit board 128, which in turn communicates with and energizes an appropriate one of the light sources 122,124,126. Stated differently, the voltage of the pilot signal of the EV 200 is communicated by way of the signaling mechanism 6 and the wire 160 to the printed circuit board 128, thereby allowing charging status to be determined. The light sources 122,124,126 correspond to a charging state, an error state, and a power ready state, respectively, and are each structured to be energized independently of each other. Accordingly, when there is a charging state, the light source 122 illuminates and the light sources 124,126 remain un-illuminated. Similarly, when there are error and power ready states, one of the light sources 124,126 is illuminated and the other two respective light sources (i.e., two of the light sources 122,124,126) remain un-illuminated. Thus, the operator will readily be able to determine charging status by viewing the connector 100 and observing which one of the three light sources 122,124,126 is illuminated. Although the connector 100 is being described herein in association with the indicating assembly 120 having the individual light sources 122,124, 126, it is within the scope of the disclosed concept for a connector (not shown) to have an alternative indicating assembly (not shown) such as, for example and without limitation, a display screen to provide a visual indication of charging status, without departing from the scope of the disclosed concept.

Referring again to FIG. 1, the first housing member 111 has a plurality of slots 113,114,115 that are each aligned with one of the light sources 122,124,126. When one of the light sources 122,124,126 is energized, visible light passes from an interior of the connector 100 to an exterior of the connector 100 through a respective one of the slots 113,114, 115 in order to provide the appropriate visual indication of charging status. As seen in FIG. 2, in the example described herein, each of the light sources 122,124,126 includes a corresponding light emitting diode 130,132,134 and a corresponding light pipe 136,138,140 coupled to the light emitting diode 130,132,134. The light emitting diodes 130, 132,134 are electrically connected to the printed circuit board 128 and receive activation signals from the signaling mechanism 6 (FIG. 1) via the printed circuit board 128 and the wire 160, or via a wireless communication. In turn, when one of the light emitting diodes 130,132,134 is activated, a respective one of the light pipes 136,138,140 transports the visible light from the respective light emitting diode 130, 132,134 through a respective one of the slots 113,114,115 in order to provide the appropriate visual indication to the operator.

Because each of the light sources 122,124,126 operates independently (i.e., only one of the light sources 122,124, 126 is illuminated at a given time) of the other light sources 122,124,126, the operator will readily be able to determine the charging status. That is, when the operator looks at the connector 100 and sees that one of the light sources 122, 124,126 is illuminated, the operator will be able to know the appropriate charging state based on which of the light sources 122,124,126 is illuminated. The connector 100 may also have written labels (i.e., labels of "charging state," "error state," and "power ready state") near the slots 113, 114,115 so that when one of the light sources 122,124,126 is illuminated, the operator can read the written label below the illuminated light source 122,124,126 and determine the charging status. To further make determination of charging status simpler for the operator, it is within the scope of the disclosed concept for each of the light sources 122,124,126 to illuminate a different color (e.g., without limitation, red, green, and blue each for a respective one of the light sources 122,124,126).

Figure 3:
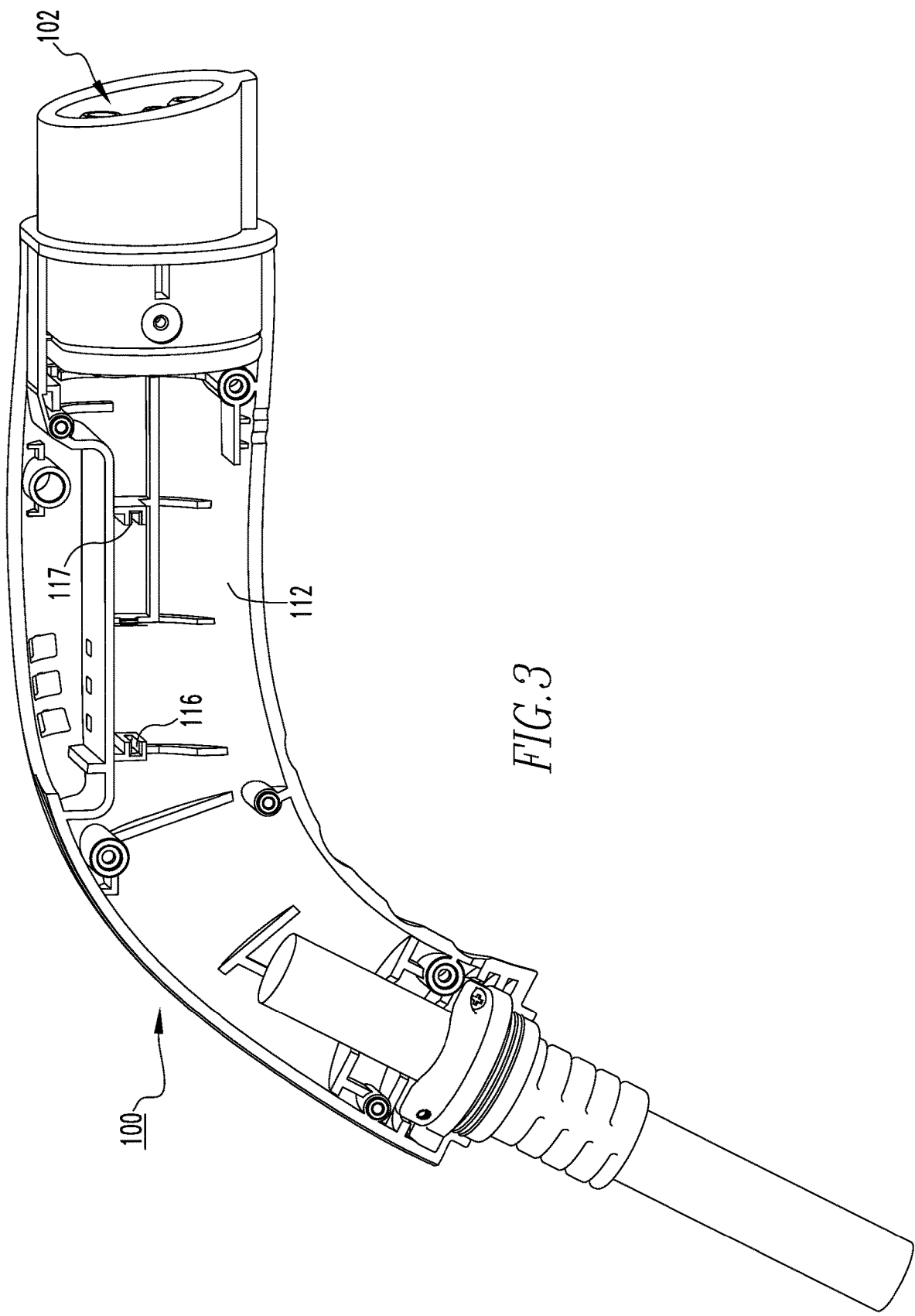
FIG. 3 is a front isometric view of the connector of FIG. 2, shown with portions removed in order to see hidden structures.

Referring to FIG. 3, the second housing member 112 has a pair of opposing internal support portions 116,117 that each have a groove. The printed circuit board 128 (FIG. 2) extends into the grooves of the support portions 116,117 in order to be reliably supported within the housing 110 (shown in FIG. 1 and partially shown in FIGS. 2 and 3 in the form of the second housing member 112). In other words, the relatively thin printed circuit board 128 extends into the grooves of the support portions 116,117 and is prevented from moving up and down in the housing 110 (with respect to the orientation of FIG. 3). When the other housing member 111 is coupled to the housing member 112, the indicating assembly 120 is prevented from moving side-to-side (i.e., into and out of the page with respect to the orientation of FIG. 3) and is thus fixed with respect to the housing 110. However, other suitable methods of retaining the printed circuit board 128 within the connector 100 may be employed, without departing from the scope of the disclosed concept.

Figure 4:
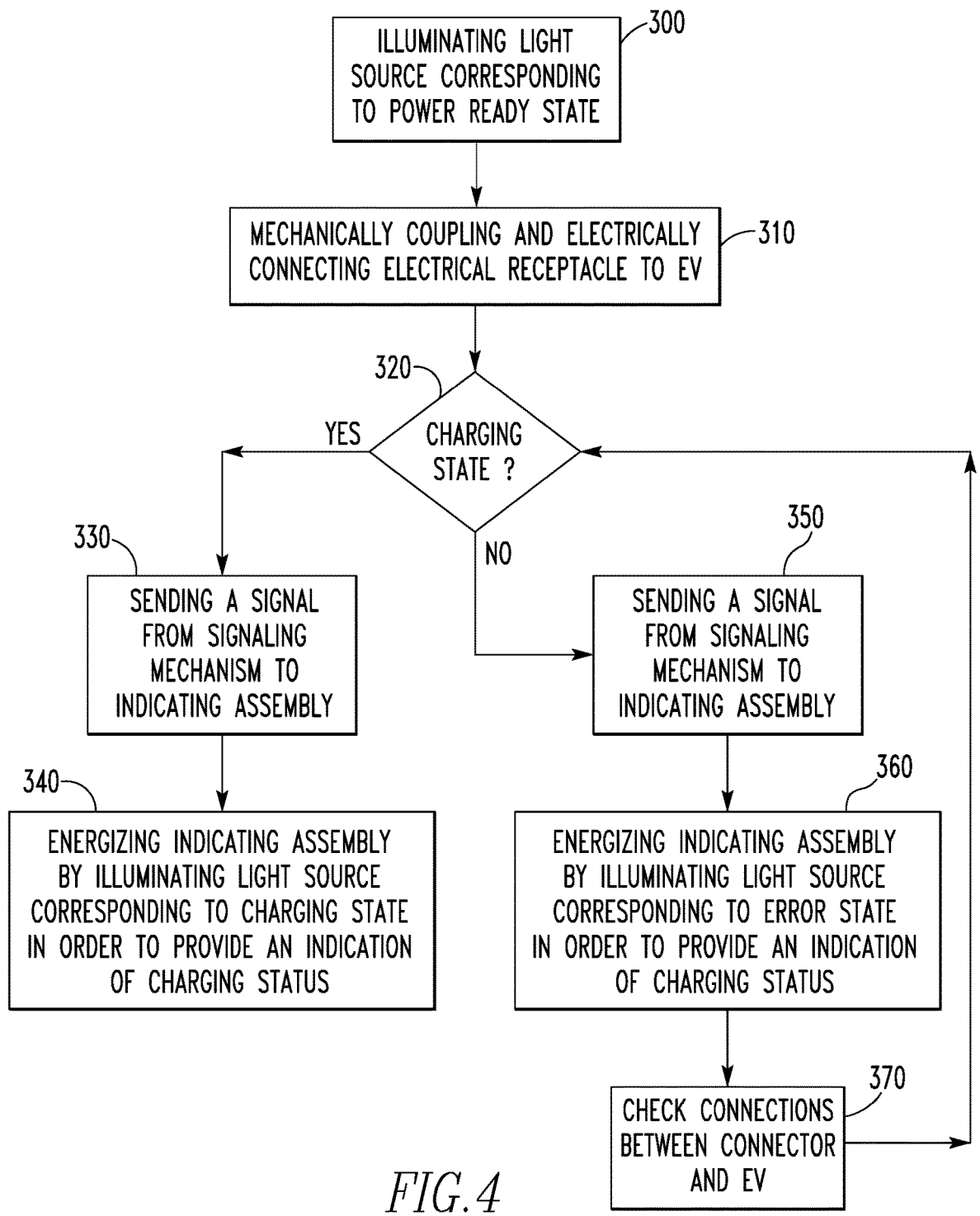
FIG. 4 is a schematic flow diagram, in block form, of a method of charging the EV.

FIG. 4 shows a schematic flow diagram, in block form, of a method of charging the EV 200 with the charging station 2. Because the connector 100 includes the light source 126 corresponding to the power ready state, the method first includes the step 300 of illuminating the light source 126 before connecting the connector 100 to the EV 200. Among other benefits, this will allow the operator attempting to charge the EV 200 to know before connecting the connector 100 to the EV 200 whether or not the charging station 2 is in a condition to charge. Thus, if the light source 126 is not illuminated, the operator will know that there is a problem with the charging station 2 that would prevent the EV 200 from being charged if connected to the connector 100, saving the operator significant time by not having to wait until a later time and realize that the EV 200 is not charging. However, it is within the scope of the disclosed concept for an alternative method to not include the step 300, as alternative connectors (not shown) may not have the light source 126. The method further includes the step 310 of mechanically coupling and electrically connecting the electrical receptacle 102 to the EV 200. After the connector 100 is coupled to the EV 200, the next step 320 is determining whether there is a charging state such that the EV 200 is being charged. This determination is based on the voltage reading of the pilot signal of the EV 200, in which different voltages correspond to different charging states.

If the answer is yes, the method further includes the step 330 of sending a signal from the signaling mechanism 6 to the indicating assembly 120, and the step 340 of energizing the indicating assembly 120 by illuminating the light source 122 corresponding to the charging state in order to provide a visual indication of charging status. Thus, when the operator observes that the light source 122 is illuminated, the operator will know the EV 200 is being charged. However, if the answer is no, the method further includes the step 350 of sending a signal from the signaling mechanism 6 to the indicating assembly 120, and the step 360 of energizing the indicating assembly 120 by illuminating the light source 124 corresponding to the error state in order to provide a visual indication of charging status. Additionally, if the answer is no, the method further includes the step 370 of checking the connections between the connector 100 and the EV 200, followed by the step 320 of determining whether there is a charging state such that the EV 200 is being charged. As a result, if the operator observes that the light source 124 is illuminated, the operator will be able to save time by adjusting the connections, rather than leaving the connector 100 connected to the EV 200 and discovering at a later point in time that the EV 200 was in fact not being charged.

Because each of the light sources 122,124,126 functions independently of one another, the method includes illuminating no more than one of the light sources 122,124,126 responsive to the signal from the signaling mechanism 6. Furthermore, as stated above, the interface between the signaling mechanism 6 and the indicating assembly 120 may be wireless. Thus, the method may further include wirelessly communicating the signal from the signaling mechanism 6 to the indicating assembly 120.

Accordingly, it will be appreciated that the disclosed concept provides for an improved charging station 2 and connector 100 therefor, and method of charging an EV 200 with the charging station 2, in which the connector 100 has an indicating assembly 120 that provides visual indication of charging status to an operator, advantageously allowing the operator to have another source (i.e., the connector 100) to readily determine charging status, in addition to the charging box 4 and the EV 200.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A connector for a charging station adapted to charge an electric vehicle, said charging station comprising a charging box having a signaling mechanism, said connector comprising:
   an electrical receptacle structured to be electrically connected to said signaling mechanism;
   a housing coupled to said electrical receptacle, said housing comprising a plurality of slots formed in an exterior of the housing;
   an indicating assembly coupled to an interior of said housing, said indicating assembly comprising indicating circuitry, a plurality of light sources disposed in a central region of the interior of the housing, and a plurality of light pipes, each of the light pipes corresponding to and coupled to one of the light sources; and
   an interface between said indicating assembly and said signaling mechanism, said interface being structured to energize said indicating assembly and transmit electrical signals from the signaling mechanism to the indicating circuitry,
   wherein the signaling mechanism is structured to provide a charging status signal corresponding to a selected one of a plurality of charging status states,
   wherein each light source is electrically connected to said interface,
   wherein each light pipe extends from its corresponding light source to one of the slots formed in the exterior of the housing,
   wherein each light source corresponds to one of the plurality of charging status states,
   wherein the indicating circuitry is structured to determine the selected one of the plurality of charging status states corresponding to the charging status signal and to selectively activate the light source which corresponds to the selected one of the plurality of charging status states,
   wherein the housing comprises a first housing member and a second housing member coupled to one another,
   wherein each of the first housing member and the second housing member extend between a first end coupled to the electrical receptacle and a second end disposed opposite the first end,
   wherein the first housing member and the second housing member each comprise an opening extending from the first end to the second end,
   wherein the first housing member and the second housing member are structured to prevent the indicating assembly from moving side to side when coupled to one another such that the opening of the first housing member is aligned with the opening of the second housing member, and
   wherein all components that couple the indicating assembly to the interior of the housing are formed within the interior of either of the first housing member or second housing member such that no portion of said components can be removed from the first housing member or second housing member without changing the structure of the first housing member or second housing member.

2. The connector of claim 1 wherein each light source is structured to be energized independently of every other light source.

3. The connector of claim 1 wherein said indicating circuitry comprises a printed circuit board mechanically coupled and electrically connected to each light source.

4. The connector of claim 1 wherein each light source comprises a corresponding light emitting diode.

5. The connector of claim 1,
   wherein said plurality of light sources comprises a first light source and a second light source,
   wherein each light source is electrically connected to the interface,
   wherein the plurality of charging status states includes a charging state and an error state,
   wherein said first light source corresponds to the charging state, and wherein said second light source corresponds to the error state.

6. The connector of claim 5 wherein the plurality of charging status states includes a power ready state, and wherein said plurality of light sources further comprises a third light source corresponding to the power ready state.

7. The connector of claim 1,
   wherein said indicating circuitry comprises a printed circuit board, and
   wherein said interface comprises a number of electrical wires electrically connected to said printed circuit board and structured to be electrically connected to said signaling mechanism.

8. The connector of claim 1 wherein said indicating circuitry comprises a printed circuit board; wherein said housing comprises a housing member having a number of internal support portions each having a groove; and wherein said printed circuit board extends into each respective groove in order to be supported within said housing.

9. A charging station for charging an electric vehicle comprising:
   a charging box having a signaling mechanism; and
   a connector comprising:
      an electrical receptacle electrically connected to said signaling mechanism,
      a housing coupled to said electrical receptacle, said housing comprising a plurality of slots formed in an exterior of the housing,
      an indicating assembly coupled to an interior of said housing, said indicator assembly comprising indicating circuitry, a plurality of light sources disposed in a central region of the interior of the housing, and a plurality of light pipes, each of the light pipes corresponding to and coupled to one of the light sources, and
      an interface between said indicating assembly and said signaling mechanism, said interface being structured to energize said indicating assembly and transmit electrical signals from the signaling mechanism to the indicating circuitry, wherein the signaling mechanism is structured to provide a charging status signal corresponding to a selected one of a plurality of charging status states, wherein each light source is electrically connected to said interface, wherein each light pipe extends from its corresponding light source to one of the slots formed in the exterior of the housing, wherein each light source corresponds to one of the plurality of charging status states, and wherein the indicating circuitry is structured to determine the selected one of the plurality of charging status states corresponding to the charging status signal and to selectively activate the light source which corresponds to the selected one of the plurality of charging status states, wherein the housing comprises a first housing member and a second housing member coupled to one another, wherein each of the first housing member and the second housing member extend between a first end coupled to the electrical receptacle and a second end disposed opposite the first end, wherein the first housing member and the second housing member each comprise an opening extending from the first end to the second end, wherein the first housing member and the second housing member are structured to prevent the indicating assembly from moving side to side when coupled to one another such that the opening of the first housing member is aligned with the opening of the second housing member, and wherein all components that couple the indicating assembly to the interior of the housing are formed within the interior of either of the first housing member or second housing member such that no portion of said components can be removed from the first housing member or second housing member without changing the structure of the first housing member or second housing member.

10. The charging station of claim 9, wherein said indicating circuitry comprises a printed circuit board, and wherein said interface comprises a number of electrical wires electrically connected to said printed circuit board and said signaling mechanism.

11. A method of charging an electric vehicle with a charging station, said charging station comprising a charging box and a connector, said charging box having a signaling mechanism, said connector comprising an electrical receptacle electrically connected to said signaling mechanism, a housing having a plurality of slots formed in an exterior of the housing coupled to said electrical receptacle, an indicating assembly coupled to an interior of said housing and comprising indicating circuitry and a plurality of light sources coupled to a corresponding plurality of light pipes each corresponding to one of the plurality of charging status states, and an interface electrically connected to each light source and disposed between said indicating assembly and said signaling mechanism, the method comprising the steps of:

mechanically coupling and electrically connecting said electrical receptacle to the electric vehicle;

sending a charging status signal from said signaling mechanism to said indicating circuitry, said charging status signal corresponding to a selected one of the plurality of charging status states; and determining the selected one of the plurality of charging status states corresponding to the charging status signal; and selectively activating the light source which corresponds to the selected one of the plurality of charging status states, wherein each of the light pipes extends from its corresponding light source to one of the slots formed in the exterior of the housing, wherein the housing comprises a first housing member and a second housing member coupled to one another, wherein each of the first housing member and the second housing member extend between a first end coupled to the electrical receptacle and a second end disposed opposite the first end, wherein the first housing member and the second housing member each comprise an opening extending from the first end to the second end, wherein the first housing member and the second housing member are structured to prevent the indicating assembly from moving side to side when coupled to one another such that the opening of the first housing member is aligned with the opening of the second housing member, and wherein all components that couple the indicating assembly to the interior of the housing are formed within the interior of either of the first housing member or second housing member such that no portion of said components can be removed from the first housing member or second housing member without changing the structure of the first housing member or second housing member.

12. The method of claim 11, wherein the method further comprises illuminating no more than one light source in response to the charging status signal from said signaling mechanism.

13. The method of claim 12, wherein said plurality of light sources comprises a first light source and a second light source;

wherein said first light source corresponds to a charging state; wherein said second light source corresponds to an error state; and wherein selectively activating the light source which corresponds to the selected one of the plurality of charging status states comprises:

either illuminating said first light source when said connector is in the charging state, or illuminating said second light source when said connector is in the error state.

14. The method of claim 12 wherein said plurality of light sources comprises one light source corresponding to a power ready state; and wherein, prior to the coupling step, the method comprises the step of:

illuminating said one light source.

* * * * *